United States Patent
Han

(10) Patent No.: US 9,702,337 B2
(45) Date of Patent: Jul. 11, 2017

(54) POWER GENERATING APPARATUS USING FLOWING WATER

(76) Inventor: YoungTae Han, Seoul (KR)

(*) Notice: Subject to any disclaimer, the term of this patent is extended or adjusted under 35 U.S.C. 154(b) by 480 days.

(21) Appl. No.: 14/239,547

(22) PCT Filed: Oct. 21, 2011

(86) PCT No.: PCT/KR2011/007907
§ 371 (c)(1),
(2), (4) Date: Feb. 19, 2014

(87) PCT Pub. No.: WO2013/027888
PCT Pub. Date: Feb. 28, 2013

(65) Prior Publication Data
US 2014/0161611 A1    Jun. 12, 2014

(30) Foreign Application Priority Data
Aug. 19, 2011  (KR) .................. 10-2011-0082573

(51) Int. Cl.
F03B 17/06    (2006.01)
(52) U.S. Cl.
CPC .......... F03B 17/066 (2013.01); F03B 17/064 (2013.01); Y02E 10/28 (2013.01)
(58) Field of Classification Search
CPC .............................. F03B 17/064; F03B 17/066
USPC ................................................ 415/5; 290/54
See application file for complete search history.

(56) References Cited

U.S. PATENT DOCUMENTS

| | | | | |
|---|---|---|---|---|
| 685,016 A | * | 10/1901 | Towsley | F03B 17/064 415/5 |
| 4,163,905 A | | 8/1979 | Davison | |
| 4,186,314 A | * | 1/1980 | Diggs | F03D 5/02 290/44 |
| 4,358,687 A | * | 11/1982 | Nyc | F03D 5/02 290/44 |
| 5,684,335 A | | 11/1997 | Ou | |
| 6,435,827 B1 | * | 8/2002 | Steiner | B63H 1/34 415/5 |

(Continued)

FOREIGN PATENT DOCUMENTS

| | | |
|---|---|---|
| CN | 101413471 | 4/2009 |
| JP | 56-132472 | 10/1981 |

(Continued)

OTHER PUBLICATIONS

International Search Report Dated Aug. 22, 2012 From the Korean Intellectual Property Office Re. Application No. PCT/KR2011/007907 and Its Translation Into English.

*Primary Examiner* — Woody Lee, Jr.

(57) ABSTRACT

A power generating apparatus using flowing water for rotating a shaft. Blades are mounted at a certain distance apart from each other on two straight sections of a chain. When the blades are immersed in water, water passes through the blades in the first straight section and then passes through the blades in the second straight section. The blades are caught on a stopper provided on the chain to be maintained in an oblique line. Direction adjusting devices are on curved sections. The oblique directions of the blades are in mutual opposition. The energy from the flow speed of water is changed into circulating power of the chain by the blades. The sprockets are driven by the chain (111), and drive rotating shafts.

5 Claims, 9 Drawing Sheets

(56) References Cited

U.S. PATENT DOCUMENTS

2010/0244452 A1   9/2010   Gardner

FOREIGN PATENT DOCUMENTS

| | | | |
|---|---|---|---|
| JP | 2010-242666 | 10/2010 | |
| KR | 10-2009-0052309 | 5/2009 | |
| KR | WO 2013035930 A1 * | 3/2013 | ............ F03B 17/066 |
| WO | WO 2013/027888 | 2/2013 | |

* cited by examiner

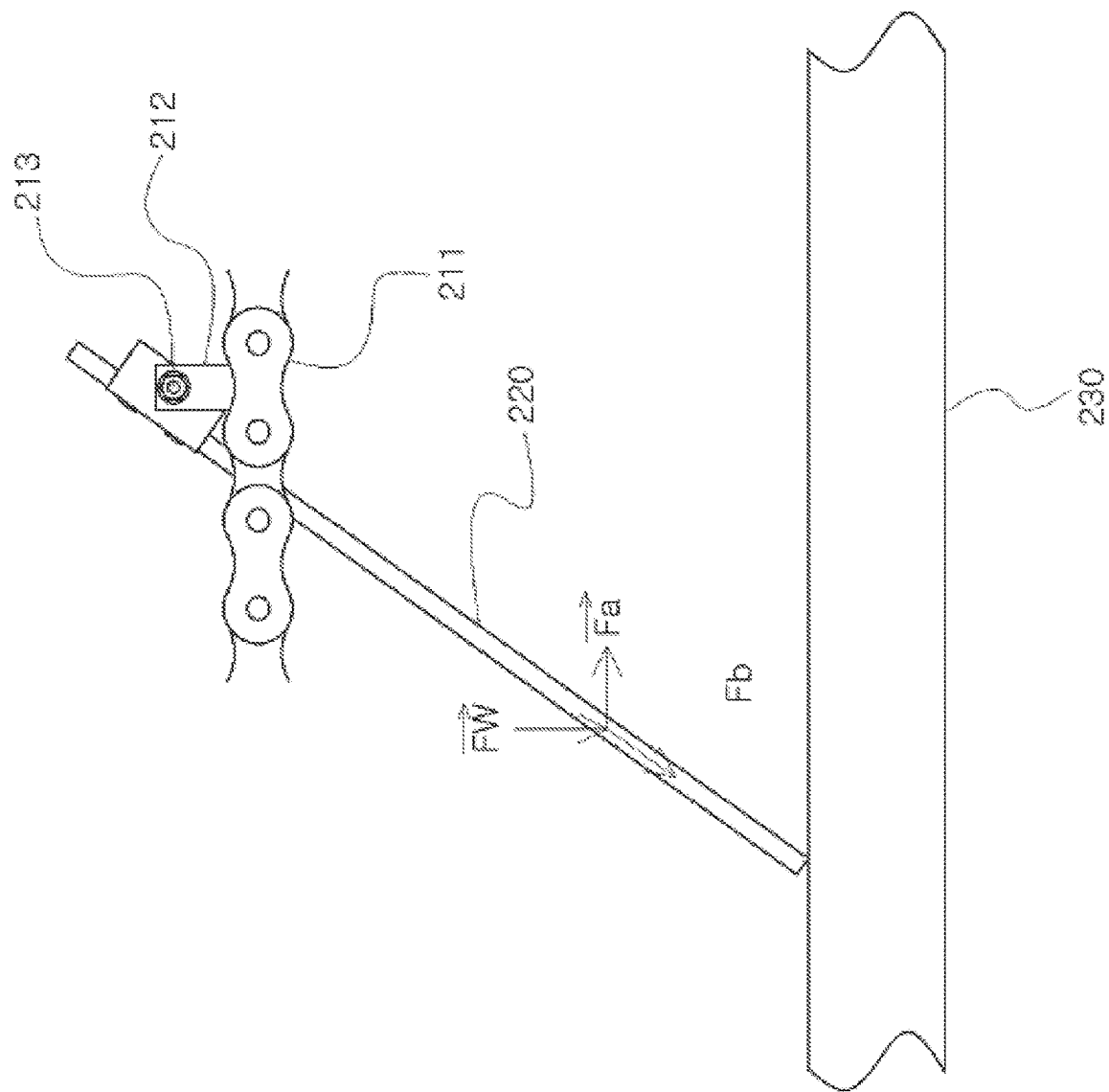

POWER GENERATING APPARATUS USING FLOWING WATER

CROSS-REFERENCE TO RELATED APPLICATION

This application is a National Phase of PCT Patent Application No. PCT/KR2011/007907 having international filing date of Oct. 21, 2011, which claims the benefit of priority of Korean Patent Application No. 10-2011-0082573, filed on Aug. 19, 2011. The contents of the above applications are all incorporated by reference as if fully set forth herein in their entirety.

TECHNICAL FIELD

The present invention relates to a power generating apparatus using flowing water, which converts energy from the flow speed of the water for generating electric power to the rotational power of a rotating shaft. Particularly, it relates to a power generating apparatus using flowing water, which can acquire rotational power on a rotating shaft by a sprocket by disposing blades in oblique and inversely oblique directions in straight sections of a chain circulating device to convert energy from flowing water into chain circulating power by the blades and thus drive the sprocket by a orbital circulation movement of a chain.

BACKGROUND ART

Korean Patent Application Publication No. 10-2009-0052309 (May 25, 2009) discloses a "flow speed power generating apparatus using a flow speed of a tidal current".

In the flow speed power generating apparatus using the flow speed of the tidal current, a pair of rollers is disposed at a certain interval so as to face each other at both ends of a buoyant object. Sprocket gears are disposed at the front and rear edges of the roller, respectively. A pair of caterpillar belts is connected to the two gears. The upper end and the lower end of the flow speed frame are mounted on the pair of caterpillar belts such that a plurality of flow speed frames are disposed between the pair of caterpillar belts. A flow speed plate and a balance belt are installed on the flow speed frame. The flow speed plate is spread when receiving a distributed force, and is folded by a hinge at the opposite side.

However, the flow speed power generating apparatus using the flow speed of the tidal current can receive a distributed force of water to convert energy from flowing water into rotational power that rotates a shaft only when a flow speed frame moves in the same direction as the water flow. When the flow speed frame moves in the opposite direction to the water flow, the flow speed frame acts as only a resistance, not increasing the rotational power of the shaft.

DISCLOSURE

Technical Problem

The present invention provides a highly efficient power generating apparatus using flowing water, which can acquire rotational power on a rotating shaft by a sprocket by disposing blades in an oblique and inversely oblique directions in straight sections of a chain circulating device to convert energy from flowing water into chain circulating power by the blades and thus drive the sprocket by a orbital circulation movement of a chain.

Technical Solution

In accordance with an aspect of the present invention, there is provided a power generating apparatus using flowing water, wherein: a plurality of blades are mounted at a certain distance apart from each other on a chain of a chain circulating device; a first straight section and a second straight section in which the chain moves in a straight line are formed on the chain circulating device; when the blades mounted on the chain circulating device are immersed in water, water passes through the blades in the first straight section and then passes through the blades in the second straight section, and the blades are caught on a stopper provided on the chain such that the blades in the first straight section and the blades in the second straight section are maintained in an oblique line with respect to the chain; first and second direction adjusting device are arranged in a first and second curved section in which the chain of the chain circulating device passes sprockets; the oblique directions of the blades in the first straight section and the blades in the second straight section are arranged in mutual opposition by the first and second direction adjusting devices; the energy from the flow speed of water is changed into the circulating power of the chain by the blades in the first straight section and the blades in the second straight section; and the sprockets are driven by the chain, and the sprockets drive rotating shafts such that a rotational power is generated at the rotating shafts.

The chain circulating device may be installed in a frame having a hexahedral structure. Two rotating shafts may face each other. The two sprockets may be mounted at the upper end of the rotating shafts. The two chain may circulate around the sprockets. The sprockets may be also mounted at the lower end of the rotating shafts.

The upper and lower ends of the blade may be pivotably mounted on an attachment of the chain by a pin, and one side surface of the blade may be caught on the stopper that is downwardly bent from one end of the attachment, and thus may be maintained to be oblique with respect to the chain (or flow direction of water) and may be changed into an arrangement state by a lever mounted on the upper end.

The lever may include a lower vertical part fitted into and fixed on the upper end of the blade, a horizontal part bent and extending from the upper end of the lower vertical part, and an upper vertical part upwardly bent and extending from the end of the horizontal part.

The first direction adjusting device may be mounted in the frame to be disposed in a first curved section of the chain circulating device, and may include a guide recess part to guide the rotation of the lever while the blade is passing the first curved section.

The second direction adjusting device may be mounted in the frame to be disposed in a second curved section of the chain circulating device, and may include a guide concave part to guide the rotation of the lever while the blade is passing the second curved section.

In accordance with another aspect of the present invention, there is provided a power generating apparatus using flowing water, wherein: a chain circulating device is mounted in a frame, and a blade includes an upper one side portion and a lower one side portion thereof rotatably mounted onto an attachment of a chain by a pin, allowing a plurality of blades to be mounted at a certain distance apart from each other on a chain of a chain circulating device; a first straight section and a second straight section in which the chain moves in a straight line are formed on the chain circulating device; when the blades mounted on the chain circulating device are immersed in water, water passes through the blades in the first straight section and then passes through the blades in the second straight section; two horizontal guiding rods are mounted in the frame, and when the blades pass the first straight section, the sides of the blades are caught on the horizontal guiding rod such that the blades become oblique; when the blades pass the second straight section, the sides of the blades are caught on the horizontal guiding rod such that the blades become inversely oblique; an energy from the flow speed of water is changed into a migration energy of the chain by the blades in the first straight section and the blades in the second straight section; and sprockets are driven by the chain, and the sprockets drive rotating shafts such that a rotational power is generated at the rotating shafts.

The chain circulating device may be installed in a frame having a hexahedral structure. The two rotating shafts may face each other. The sprockets may be mounted at the upper end of the rotating shafts, respectively. The two chains may circulate around the sprocket disposed at the upper end of the rotating shafts and the sprocket disposed at the lower end of the rotating shafts, respectively.

The blade may have an oblique inclination angle varying according to a gap between the horizontal guiding rods and the chain.

Advantageous Effects

A power generating apparatus using flowing water according to embodiments of the present invention has an effect of highly efficiently converting energy from flowing water into rotational power by minimizing a useless movement section existing in a typical water turbine, and is economical in its manufacturing cost due to its simple structure.

BRIEF DESCRIPTION OF DRAWINGS

FIG. 9 is a magnified view illustrating a chain mounted with a blade of FIG. 8.

BEST MODES FOR CARRYING OUT THE INVENTION

Hereinafter, exemplary embodiments of the present invention will be described in detail with reference to the accompanying drawings.

Figure 1:
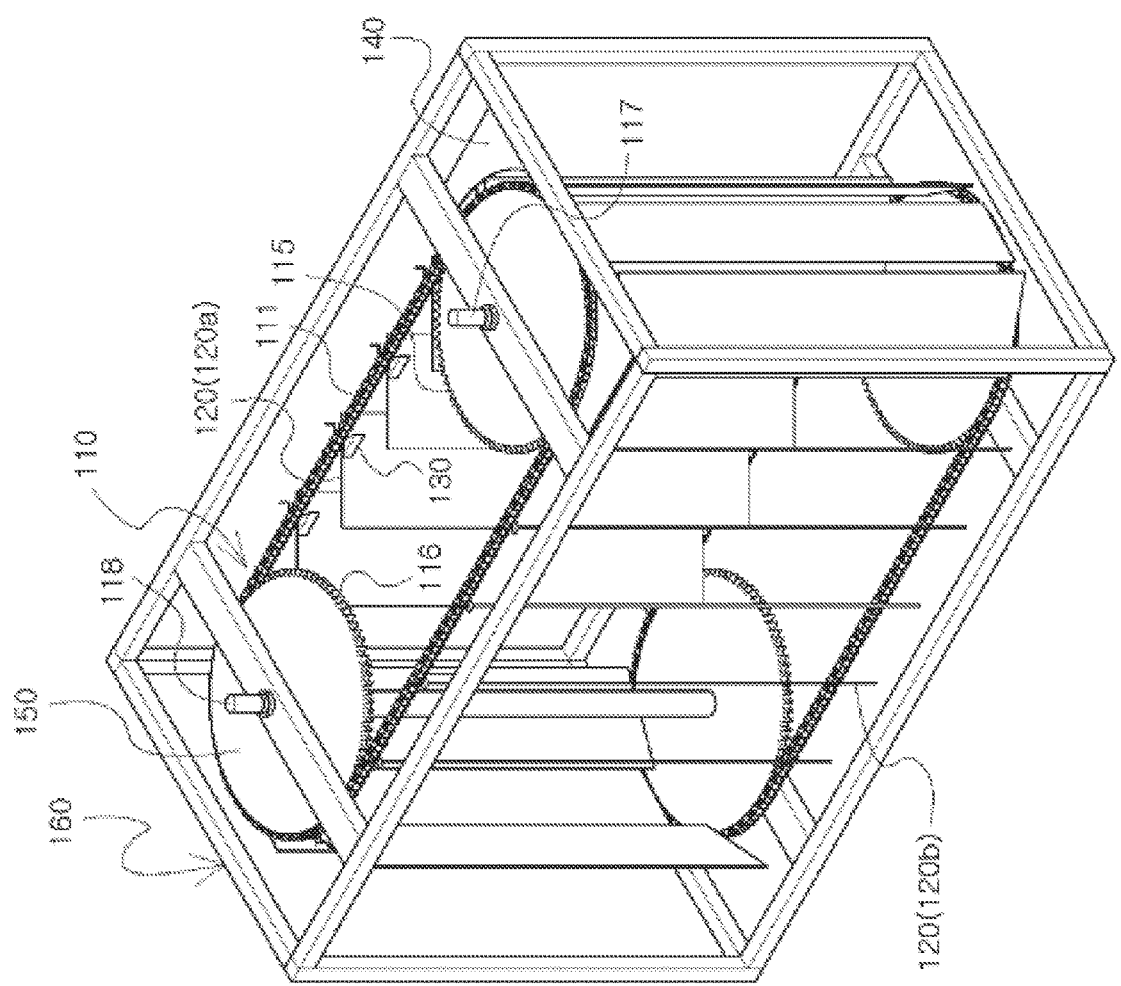
FIG. 1 is a perspective view illustrating a power generating apparatus using flowing water according to a first embodiment of the present invention.
Figure 2:
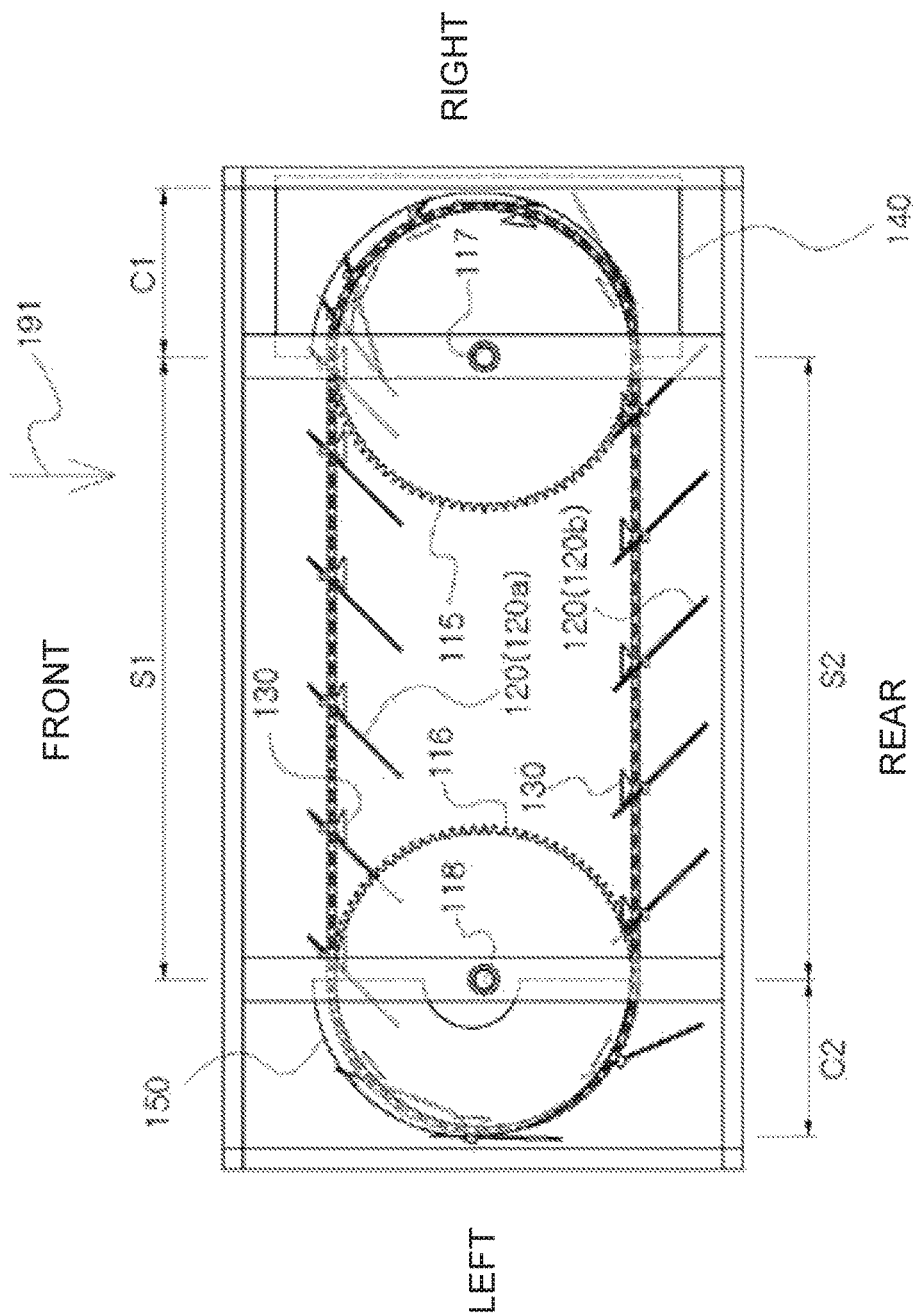
FIG. 2 is a plan view illustrating a power generating apparatus using flowing water according to a first embodiment of the present invention.

Referring to FIGS. 1 and 2, a power generating apparatus using flowing water according to a first embodiment of the present invention is shown. Here, a plurality of blades 120 are mounted at a certain distance apart from each other on a chain of a chain circulating device 110. A first straight section S1 and a second straight section S2 in which the chain 111 moves in a straight line are formed on the chain circulating device 110. When the blades 120 mounted on the chain circulating device 110 are immersed in water, water passes through the blades 120a in the first straight section S1 and then passes through the blades 120b in the second straight section S2, and the blades 120 are caught on a stopper 130 provided on the chain 111 such that the blades 120a in the first straight section S1 and the blades 120b in the second straight section S2 are maintained in an oblique line with respect to the chain 111. First and second direction adjusting device 140 and 150 are arranged in a first and second curved section C1 and C2 in which the chain 111 of the chain circulating device 110 passes sprockets 115 and 116. The oblique directions of the blades 120a in the first straight section S1 and the blades 120b in the second straight section S2 are arranged in mutual opposition by the first and second direction adjusting devices 140 and 150. The energy from the flow speed of water is changed into the circulating power of the chain 111 by the blades 120a in the first straight section S1 and the blades 120b in the second straight section S2. The sprockets 115 and 116 are driven by the chain 111, and the sprockets 115 and 116 drive rotating shafts 117 and 118 such that a rotational power is generated at the rotating shafts 117 and 118.

Figure 3:
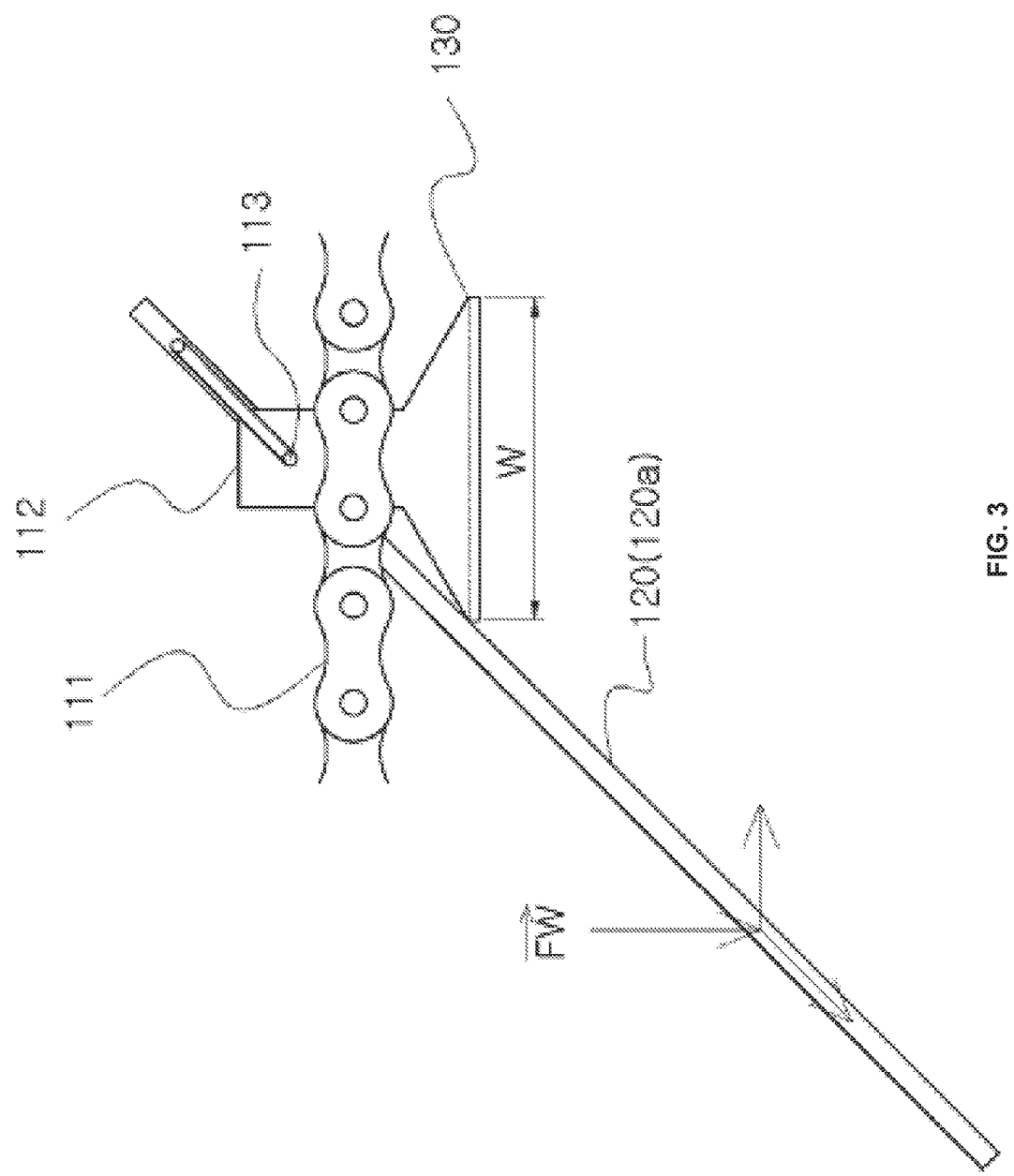
FIG. 3 is a schematic view illustrating an outer product vector of water acting on a blade disposed in a first straight section section.

Referring to FIGS. 2 and 3, the power generating apparatus using flowing water according to the first embodiment of the present invention acts as follows.

As shown in FIG. 2, when water flows from the front side to the rear side, i.e., in a direction of an arrow 191, water hits the blades disposed in an oblique direction. As shown in FIG. 3, a horizontal component Fa acts on the blade 120 such that the blade 120 moves in the direction of the horizontal component Fa. Thus, the chain 111 is moved from the left side to the right side in the first straight section S1 by the blade 120. In this case, n blades may be disposed in the first straight section S1. Thus, since n horizontal components are added, a high output can be acquired.

Also, the flow energy of water acts on the blade 120 in the second straight section S2, allowing the chain 111 of the second straight section S2 to be moved from the right side to the left side by the blade 120.

Accordingly, the circulation kinetic energy of the chain become equal to the sum of the horizontal components acting on the blades in the first straight section and the horizontal components acting on the blades in the second straight section. Thus, the conversion efficiency of the flow energy into the rotational energy may be very high, and the rotating power of the rotating shaft may drive a generator to produce electrical energy.

Referring again to FIG. 1, the chain circulating device 110 is installed in a frame 160 having a hexahedral structure. Two rotating shafts 117 and 118 face each other. The sprockets 115 and 116 are mounted at the upper end of the rotating shafts 117 and 118. The chain 111 circulates around the sprockets 115 and 116. Also, sprockets are mounted at the lower end of the rotating shafts 117 and 118, and a chain circulates around the sprockets.

Thus, the circulation movement of the chain 111 drives the sprockets 115 and 116, and the sprockets 115 and 116 rotate the two rotating shafts 117 and 118 to acquire a rotational power from one or both of the two rotating shafts 117 and 118.

Figure 4:
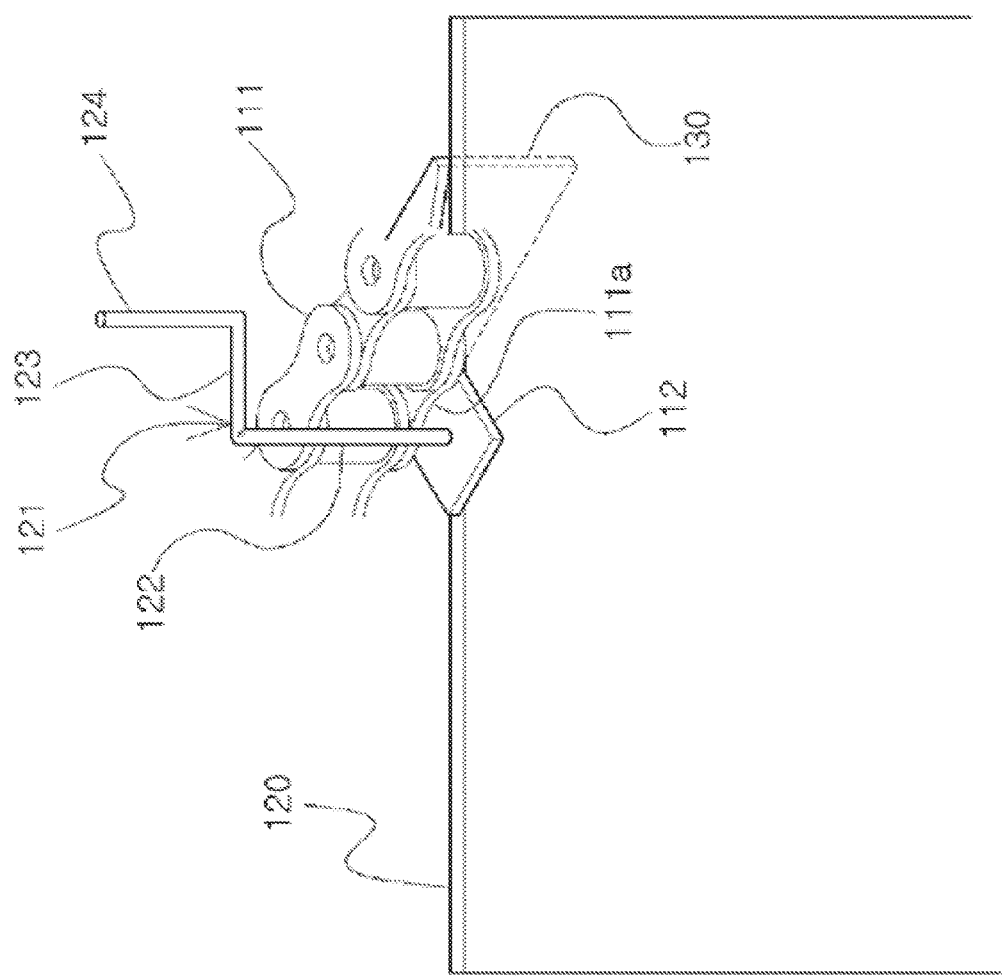
FIG. 4 is a perspective view illustrating a chain mounted with a blade.

Referring to FIGS. 3 and 4, the upper and lower ends of the blade 120 are pivotably mounted on an attachment 112 of the chain 111 by a pin 113. One side surface of the blade 120 is caught on the stopper 130 that is downwardly bent from one end of the attachment 112, and thus is maintained to be oblique with respect to the chain 111 (or flow direction of water) and is changed into an arrangement state by a lever 121 mounted on the upper end.

Referring to FIG. 4, the lever 121 includes a lower vertical part 122 fitted into and fixed on the upper end of the blade 120, a horizontal part 123 bent and extending from the upper end of the lower vertical part 122, and an upper vertical part 124 upwardly bent and extending from the end of the horizontal part 123.

Also, the lower vertical part 122 of the lever 121 is fixed on the upper end so as to be biased to one side portion based on the center of the blade 120 through the attachment 112, and the rotation of the lower vertical part 122 is not interfered by the attachment 112.

The slope of the blade 120 that is obliquely disposed is determined by the width W of the stopper 130. Accordingly, the width W of the stopper 130 is determined in consideration of the flow speed and flow rate of water.

As shown in FIG. 4, the attachment 112 may be fixed on a link plate 111a of the chain 111 by a rivet (not shown), or may be formed integrally with the link plate 111a of the chain 111 when manufactured.

Figure 5:
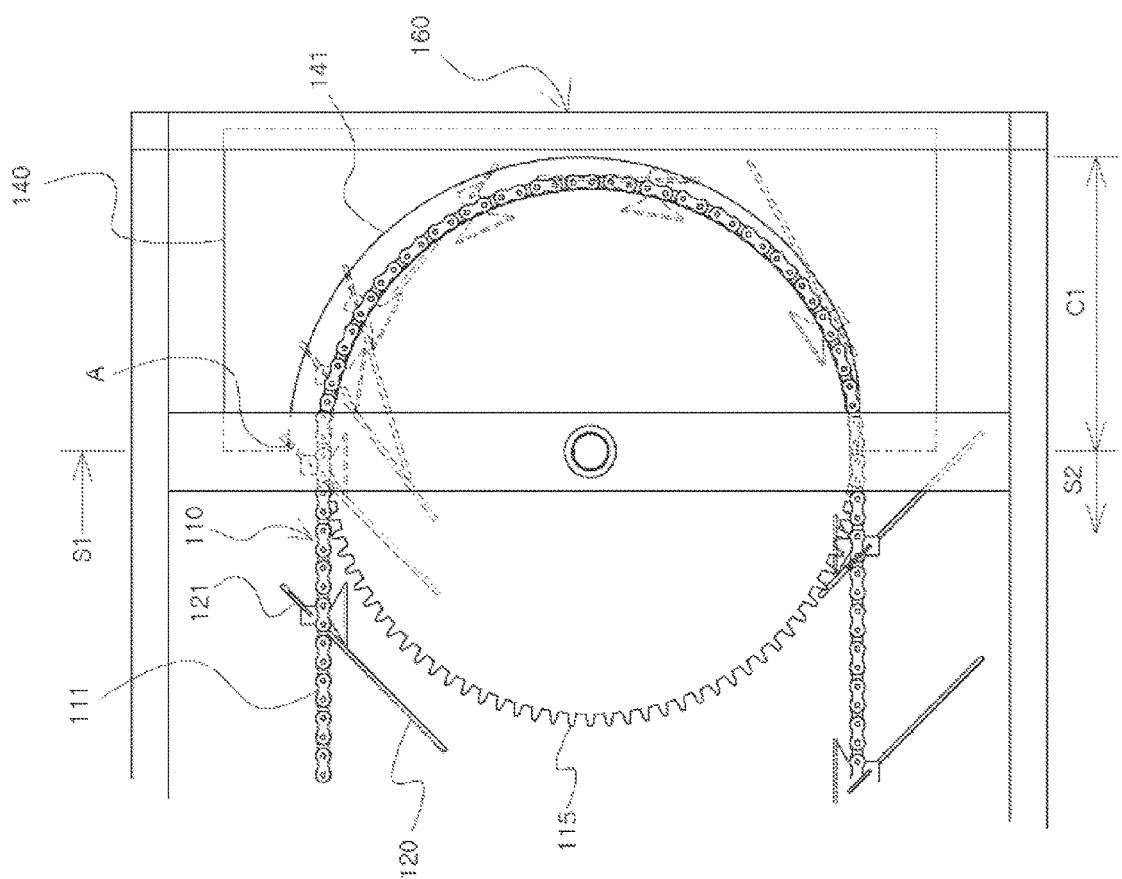
FIG. 5 is a plan view illustrating a first direction adjusting device.

Referring to FIG. 5, the first direction adjusting device 140 is mounted in the frame 160 to be disposed in a first curved section C1 of the chain circulating device 110, and includes a guide recess part 141 to guide the rotation of the lever 121 while the blade 120 is passing the first curved section C1.

Thus, when the blade 120 passing through the first straight section S1 reaches a start point A of the first curved section C1, the lever 121 is adhered closely to the guide recess part 141. Thereafter, while the blade 120 is passing through the first curved section C1 by the chain 111, the lever 121 moves along the guide recess part 141, allowing the blade 120 to be disposed in the inversely oblique direction opposite to the oblique direction of the first straight section S1 when moving to the second straight section S2 through the first curved section C1.

Figure 6:
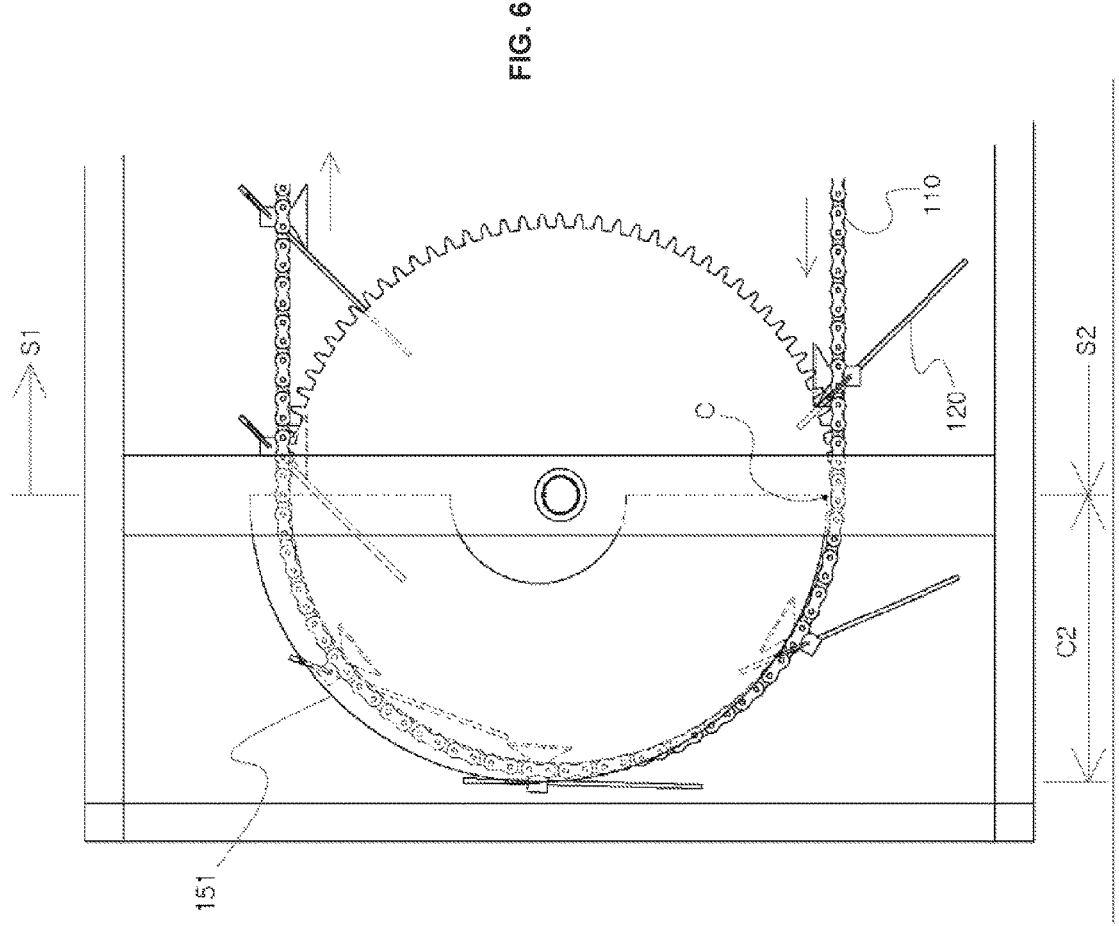
FIG. 6 is a plan view illustrating a second direction adjusting device.

Referring to FIG. 6, the second direction adjusting device 150 is mounted in the frame 160 to be disposed in a second curved section C2 of the chain circulating device 110, and includes a guide concave part 151 to guide the rotation of the lever 121 while the blade 120 is passing the second curved section C2.

Thus, when the blade 120 passing through the second straight section S2 reaches a start point C of the second curved section C2, the lever 121 is adhered closely to the guide concave part 151. Thereafter, while the blade 120 is passing through the second curved section C2 by the chain 111, the lever 121 moves along the guide concave part 151, allowing the blade 120 to be disposed in the inversely oblique direction opposite to the oblique direction of the second straight section S2 when moving to the first straight section S1 through the second curved section C2.

The power generating apparatus using flowing water according to the first embodiment of the present invention operates as follows.

When water passes the blade 120a of the first straight section S1, the flow energy of water allows the blade 120 to be pushed from the left side to the right side. In this case, the chain 111 is moved from the left side to the right side by the blade 120 in the first straight section S1, and the blades 120 of the second straight section S2 are also moved from the right side to the left side by water, allowing the chain 111 of the second straight section S2 to move from the right side to the left side. Thus, the chain 111 performs an orbital circulation movement, and thus the sprockets 115 and 116 coupled to the chain 111 rotate, generating rotational energy at the rotating shafts 117 and 118 by the rotation of the sprockets 115 and 116.

In this case, the blade 120a of the first straight section S1 is disposed in an oblique direction, but is disposed in an inversely oblique direction by the first direction adjusting device 140 when reaching the second straight section S2 through the first curved section C1. Also, the blade 120b of the second straight section S2 is again disposed in the oblique direction while passing the second direction adjusting device 150. Thus, the blades 120 are disposed in the oblique and inversely oblique directions in the first and second straight sections S1 and S2, respectively.

Figure 7:
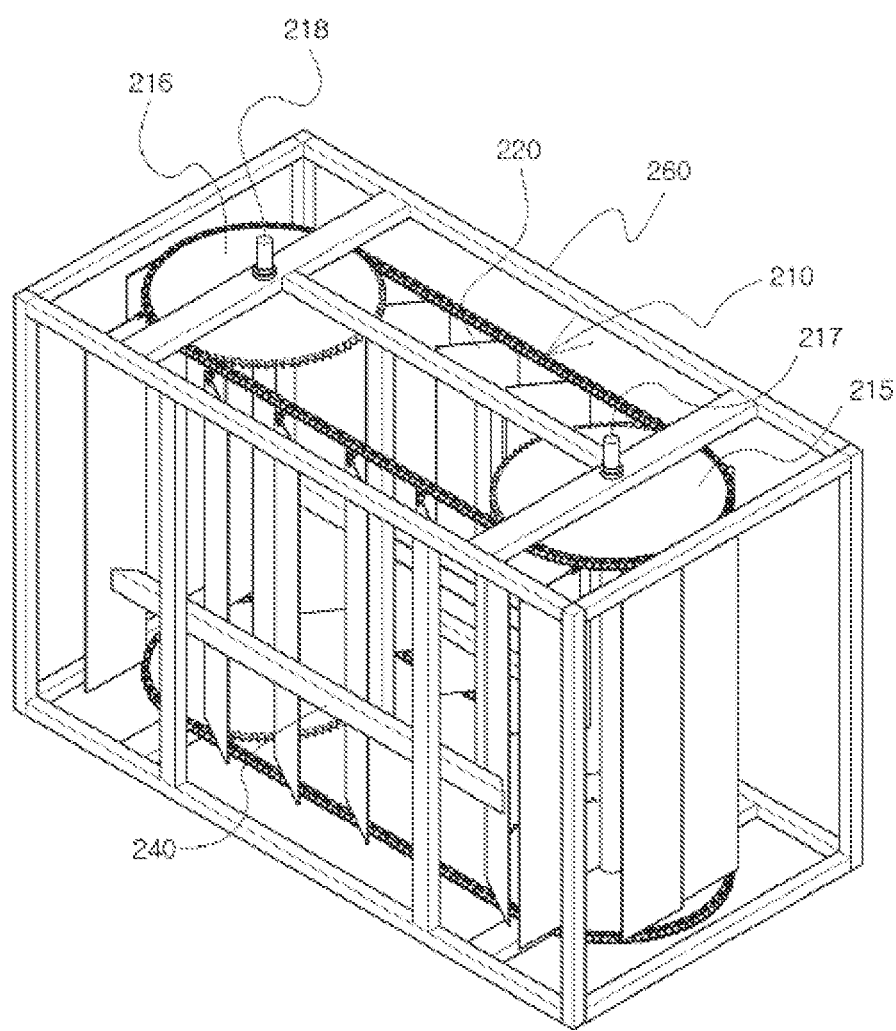
FIG. 7 is a perspective view illustrating a power generating apparatus using flowing water according to a second embodiment of the present invention.

Referring to FIGS. 7 and 9, a power generating apparatus using flowing water according to a second embodiment of the present invention is shown. Here, a chain circulating device 210 is mounted in a frame 260, and a blade 220 includes an upper one side portion and a lower one side portion thereof rotatably mounted onto an attachment 212 of a chain 211 by a pin 213, allowing a plurality of blades 220 to be mounted at a certain distance apart from each other on a chain 211 of a chain circulating device 210. A first straight section D1 and a second straight section D2 in which the chain 211 moves in a straight line are formed on the chain circulating device 210. When the blades 220 mounted on the chain circulating device 210 are immersed in water, water passes through the blades 220 in the first straight section D1 and then passes through the blades 220 in the second straight section D2. Horizontal guiding rods 230 and 240 are mounted in the frame 260, and when the blades 220 pass the first straight section D1, the sides of the blades 120 are caught on the horizontal guiding rod 230 such that the blades 220 become oblique. When the blades 220 pass the second straight section D2, the sides of the blades 120 are caught on the horizontal guiding rod 240 such that the blades 220 become inversely oblique. Thus, energy from the flow speed of water is changed into migration energy of the chain 211 by the blades 220 in the first straight section D1 and the blades 220 in the second straight section D2. Sprockets 215 and 216 are driven by the chain 211, and the sprockets 215 and 216 drive rotating shafts 217 and 218 such that a rotational power is generated at the rotating shafts 217 and 218.

Figure 8:
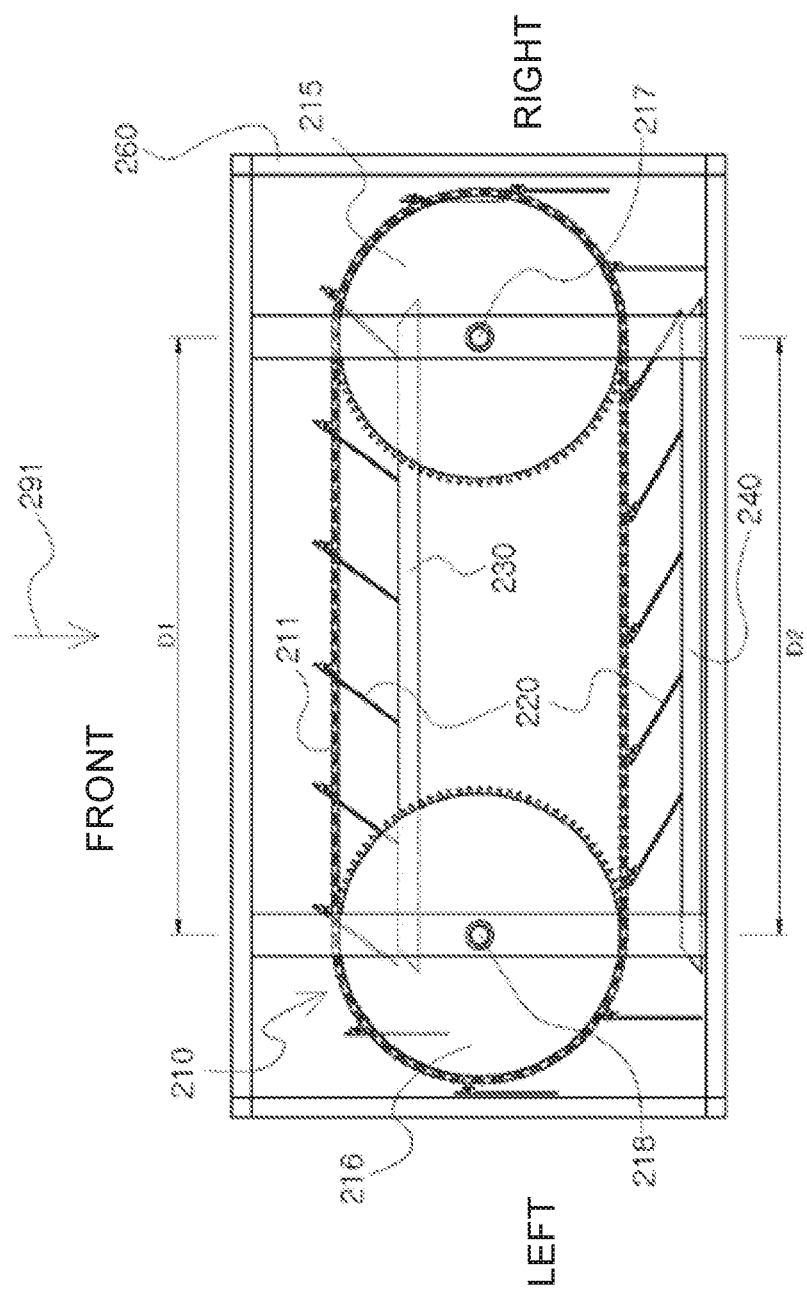
FIG. 8 is a plan view illustrating a power generating apparatus using flowing water according to a second embodiment of the present invention.

In the power generating apparatus using flowing water according to the second embodiment of the present invention, when water flows from the front side to the rear side, i.e., in a direction of an arrow 291 of FIG. 8, water hits the blades disposed in an oblique direction. As shown in FIG. 3, a horizontal component Fa acts on the blade 220 such that the blade 220 moves in the direction of the horizontal component Fa. Thus, the chain 211 is moved from the left side to the right side in the first straight section D1 by the blade 220. In this case, n blades may be disposed in the first straight section S1. Thus, since n horizontal components are added, a high output can be acquired.

Also, the flow energy of water acts on the blade 220 in the second straight section D2 as described above, allowing the chain 211 of the second straight section D2 to be moved from the right side to the left side by the blade 220.

Accordingly, the circulation power of the chain become equal to the sum of the horizontal components acting on the blades 220 in the first straight section D1 and the horizontal components acting on the blades 220 in the second straight section D2. Thus, the conversion efficiency of the flow energy into the rotational energy may be very high, and the rotating power of the rotating shaft may drive a generator to produce electrical energy.

The chain circulating device 210 is installed in a frame 260 having a hexahedral structure. Two rotating shafts 217 and 218 face each other. The sprockets 215 and 216 are mounted at the upper end of the rotating shafts 217 and 218, respectively. The two chains 211 circulate around the sprocket 215 disposed at the upper end of the rotating shafts 217 and 218 and the sprocket 216 disposed at the lower end of the rotating shafts 217 and 218, respectively.

Thus, the circulation movement of the chain 211 drives the sprockets 215 and 216, and the sprockets 215 and 216 rotate the two rotating shafts 217 and 218 to acquire a rotational power from one or both of the two rotating shafts 217 and 218.

The blade 220 has an oblique inclination angle varying according to a gap between the horizontal guiding rods 230 and 240 and the chain 211.

The power generating apparatus using flowing water according to the second embodiment of the present invention operates as follows.

When water passes the blade 220 of the first straight section D1, the flow energy of water allows the blade 220 to be pushed from the left side to the right side. In this case, the chain 211 is moved from the left side to the right side by the blade 220 in the first straight section D1, and the blades 220 of the second straight section D2 are also moved from the right side to the left side by water, allowing the chain 211 of the second straight section D2 to move from the right side to the left side. Thus, the chain 211 performs an orbital circulation movement, and thus the sprockets 215 and 216 coupled to the chain 211 rotate, generating rotational energy at the rotating shafts 217 and 218 by the rotation of the sprockets 215 and 216.

In this case, the blade 220 is obliquely disposed in the first straight section D1 by the horizontal guiding rod 230. However, when the chain 211 passes the sprocket 215, the blade 220 can freely pivot because there is no factor that restricts the blade 220. Accordingly, the blade 220 becomes upright in the flow direction of water. Thereafter, the blade 220 is inverse-obliquely disposed in the second straight section D2 by the horizontal guiding rod 240, and when the chain 211 passes the sprocket 216, the blade 220 can freely pivot because there is no factor that restricts the blade 220. Accordingly, the blade 220 becomes upright in the flow direction of water.

The power generating apparatus using flowing water according to the first and second embodiments of the present invention has an advantage of highly efficiently converting energy from flowing water into rotational power by minimizing a useless movement section existing in a typical water turbine.

The invention claimed is:

1. A power generating apparatus using flowing water, wherein:

a plurality of blades 120 are mounted at a certain distance apart from each other on a chain of a chain circulating device 110;

a first straight section S1 and a second straight section S2 in which the chain 111 moves in a straight line are formed on the chain circulating device 110;

when the blades 120 mounted on the chain circulating device 110 are immersed in water, water passes through the blades 120$a$ in the first straight section S1 and then passes through the blades 120$b$ in the second straight section S2, and the blades 120$a$ are caught on a stopper 130 provided on the chain 111 such that the blades 120$b$ in the first straight section S1 and the blades in the second straight section S2 are maintained in an oblique line with respect to the chain 111;

first and second direction adjusting device 140 and 150 are arranged in a first and second curved section C1 and C2 in which the chain 111 of the chain circulating device 110 passes sprockets 115 and 116;

the oblique directions of the blades 120$a$ in the first straight section S1 and the blades 120$b$ in the second straight section S2 are arranged in mutual opposition by the first and second direction adjusting devices 140 and 150;

the energy from the flow speed of water is changed into the circulating power of the chain 111 by the blades 120$a$ in the first straight section S1 and the blades 120$b$ in the second straight section S2; and the sprockets 115 and 116 are driven by the chain 111, and the sprockets 115 and 116 drive rotating shafts 117 and 118 such that a rotational power is generated at the rotating shafts 117 and 118, wherein the upper and lower ends of the blade 120 are pivotably mounted on an attachment 112 of the chain 111 by a pin 113, and one side surface of the blade is caught on the stopper 130 that extends obliquely downward from one end of the attachment 112, and thus is maintained to be oblique with respect to the chain 111 or flow direction of water and is changed into an arrangement state by a lever 121 mounted on the upper end.

2. The power generating apparatus of claim 1, wherein:

the chain circulating device 110 is installed in a frame 160 having a hexahedral structure;

the rotating shafts 117 and 118 face each other;

the sprockets 115 and 116 are mounted at the upper end of the rotating shafts 117 and 118;

the chain 111 circulates around the sprockets 115 and 116; and the sprockets are also mounted at the lower end of the rotating shafts 117 and 118.

3. The power generating apparatus of claim 1, wherein the lever 121 comprises a lower vertical part 122 fitted into and fixed on the upper end of the blade 120, a horizontal part 120 bent and extending from the upper end of the lower vertical part 122, and an upper vertical part 124 upwardly bent and extending from the end of the horizontal part 123.

4. The power generating apparatus of claim 1, wherein the first direction adjusting device 140 is mounted in the frame to be disposed in a first curved section C1 of the chain circulating device 110, and comprises a guide recess part 141 to guide the rotation of the lever 121 while the blade 120 is passing the first curved section C1.

5. The power generating apparatus of claim 4, wherein the second direction adjusting device 150 is mounted in the frame 160 to be disposed in a second curved section S2 of the chain circulating device 110, and comprises a guide concave part 151 to guide the rotation of the lever 121 while the blade 120 is passing the second curved section C2.

\* \* \* \* \*